United States Patent
Misumi

(10) Patent No.: US 8,594,019 B2
(45) Date of Patent: Nov. 26, 2013

(54) COMMUNICATION DEVICE, AND COMPUTER-READABLE STORAGE DEVICE AND METHOD FOR THE SAME

(75) Inventor: Kazuhito Misumi, Konan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 302 days.

(21) Appl. No.: 13/037,165

(22) Filed: Feb. 28, 2011

(65) Prior Publication Data

US 2011/0211454 A1   Sep. 1, 2011

(30) Foreign Application Priority Data

Feb. 26, 2010   (JP) ................... 2010-041315

(51) Int. Cl.
   *H04W 4/00*   (2009.01)
(52) U.S. Cl.
   USPC ........................................ 370/328
(58) Field of Classification Search
   None
   See application file for complete search history.

(56) References Cited

U.S. PATENT DOCUMENTS

| 2003/0219002 | A1 | 11/2003 | Kishida |
| 2004/0116075 | A1* | 6/2004 | Shoemake et al. ............ 455/41.2 |
| 2008/0207132 | A1 | 8/2008 | Wakizaka |

FOREIGN PATENT DOCUMENTS

| CN | 101257534 A | 9/2008 |
| JP | 2003-249973 A | 9/2003 |
| JP | 2006-186941 A | 7/2006 |

OTHER PUBLICATIONS

PC Watch, "My WiFi Technology," Impress Watch Corporation, Jun. 30, 2009, available at http://pc.watch.impress.co.jp/docs/column/hot/20090630_298404.html (searched on Oct. 7, 2010). (Partial translation enclosed.).

State Intellectual Property Office of the People's Republic of China, Notification of First Office Action for Chinese Patent Application No. 201110038140.4 (counterpart to above-captioned patent application), mailed May 6, 2013.

* cited by examiner

*Primary Examiner* — Chi Pham
*Assistant Examiner* — Kouroush Mohebbi
(74) *Attorney, Agent, or Firm* — Baker Botts L.L.P.

(57) ABSTRACT

A communication device is provided that includes a communication unit configured to perform communication of a voice signal with a party device via a communication line, a wireless communication unit configured to perform wireless communication of a data signal with an external device, and a controller configured to perform first wireless communication and second wireless communication in parallel, using the wireless communication unit. The first wireless communication is adapted to enable wireless communication of the voice signal between a voice communication device and the communication unit via the wireless communication unit. The second wireless communication is adapted to enable wireless communication of the data signal between the external device and the wireless communication unit.

15 Claims, 6 Drawing Sheets

US 8,594,019 B2

COMMUNICATION DEVICE, AND COMPUTER-READABLE STORAGE DEVICE AND METHOD FOR THE SAME

CROSS-REFERENCE TO RELATED APPLICATION

This application claims priority under 35 U.S.C. §119 from Japanese Patent Application No. 2010-041315 filed on Feb. 26, 2010. The entire subject matter of the application is incorporated herein by reference.

BACKGROUND

1. Technical Field

The following description relates to one or more techniques for performing wireless voice communication and wireless data communication.

2. Related Art

A communication system has been known that includes a base phone for a digital cordless phone and a wireless local area network (WLAN). The communication system is configured to perform in parallel voice communication using the digital cordless phone and data communication using the WLAN.

SUMMARY

A manufacturing cost for the communication system is generally high as the communication system includes both the base phone for the digital cordless phone and the WLAN.

The communication system may be configured to perform ad-hoc mode communication in which voice communication using an extension phone set is implemented via direct WLAN communication between the extension phone set and (a communication device on) the WLAN. Such a configuration does not need the base phone for the digital cordless phone. However, in this case, the WLAN is used exclusively by the extension phone set while the extension phone set is in use. Thus, in this case, it is impossible to perform in parallel the voice communication using the extension phone set and the data communication using the WLAN (an infrastructure mode).

Further, the communication system may be configured to perform infrastructure mode communication in which the voice communication using the extension phone set is implemented via indirect WLAN communication with an access point provided between the extension phone set and (the communication device on) the WLAN. Such a configuration does not need the base phone for the digital cordless phone. Further, since the access point is provided between the extension phone set and the WLAN, it is possible to perform in parallel the voice communication using the extension phone set and the data communication using the WLAN. However, in this case, a security level is determined by a security setting for the access point. Additionally, information, which is contained in the voice communication that is performed via the access point used in common, might be stolen. Thus, it is hard to assure a high level of security.

Aspects of the present invention are advantageous to provide one or more improved techniques that make it possible to establish a communication system configured to perform in parallel wireless voice communication and wireless data communication with high security and a low cost.

According to aspects of the present invention, a communication device is provided, which includes a communication unit configured to perform communication of a voice signal with a party device via a communication line, a wireless communication unit configured to perform wireless communication of a data signal with an external device, and a controller configured to perform first wireless communication and second wireless communication in parallel, using the wireless communication unit. The first wireless communication is adapted to enable wireless communication of the voice signal between a voice communication device and the communication unit via the wireless communication unit. The second wireless communication is adapted to enable wireless communication of the data signal between the external device and the wireless communication unit.

According to aspects of the present invention, further provided is a computer-readable storage device storing computer-readable instructions. When executed by a processor that includes a communication unit configured to perform communication of a voice signal with a party device via a communication line, and a wireless communication unit configured to perform wireless communication of a data signal with an external device, the instructions cause the processor to perform first wireless communication and second wireless communication in parallel, using the wireless communication unit. The first wireless communication is adapted to enable wireless communication of the voice signal between a voice communication device and the communication unit via the wireless communication unit. The second wireless communication is adapted to enable wireless communication of the data signal between the external device and the wireless communication unit.

According to aspects of the present invention, further provided is a method adapted to be implemented on a processor that includes a communication unit configured to perform communication of a voice signal with a party device via a communication line and a wireless communication unit configured to perform wireless communication of a data signal with an external device. The method comprises a step of performing first wireless communication and second wireless communication in parallel, using the wireless communication unit. The first wireless communication is adapted to enable wireless communication of the voice signal between a voice communication device and the communication unit via the wireless communication unit. The second wireless communication is adapted to enable wireless communication of the data signal between the external device and the wireless communication unit.

BRIEF DESCRIPTION OF THE ACCOMPANYING DRAWINGS

FIG. 1 exemplifies a configuration of a communication system in a first embodiment according to one or more aspects of the present invention.

Figure 5:
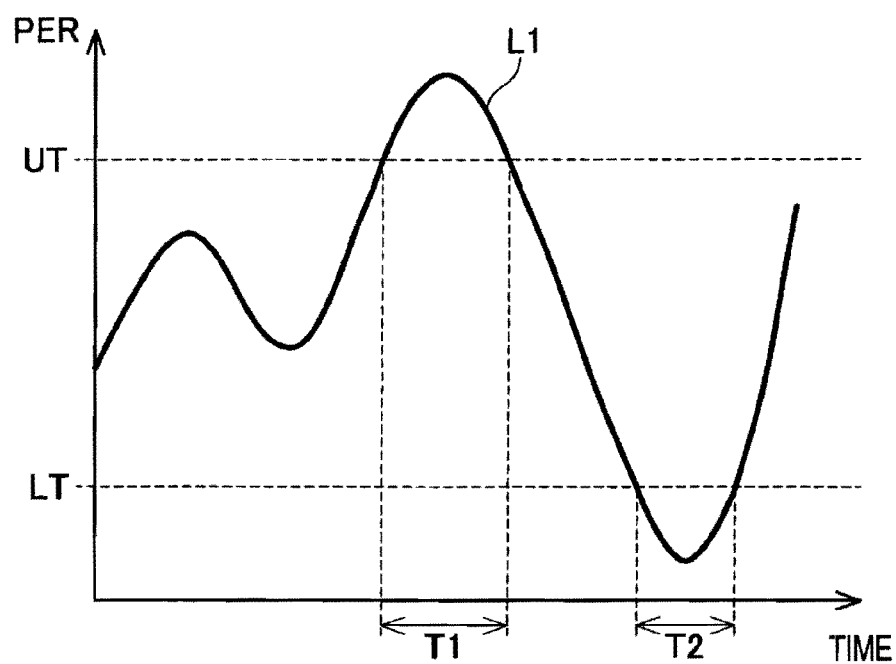

FIG. 5 exemplifies time fluctuation of a packet error rate (PER) in the second embodiment according to one or more aspects of the present invention.

Figure 6:
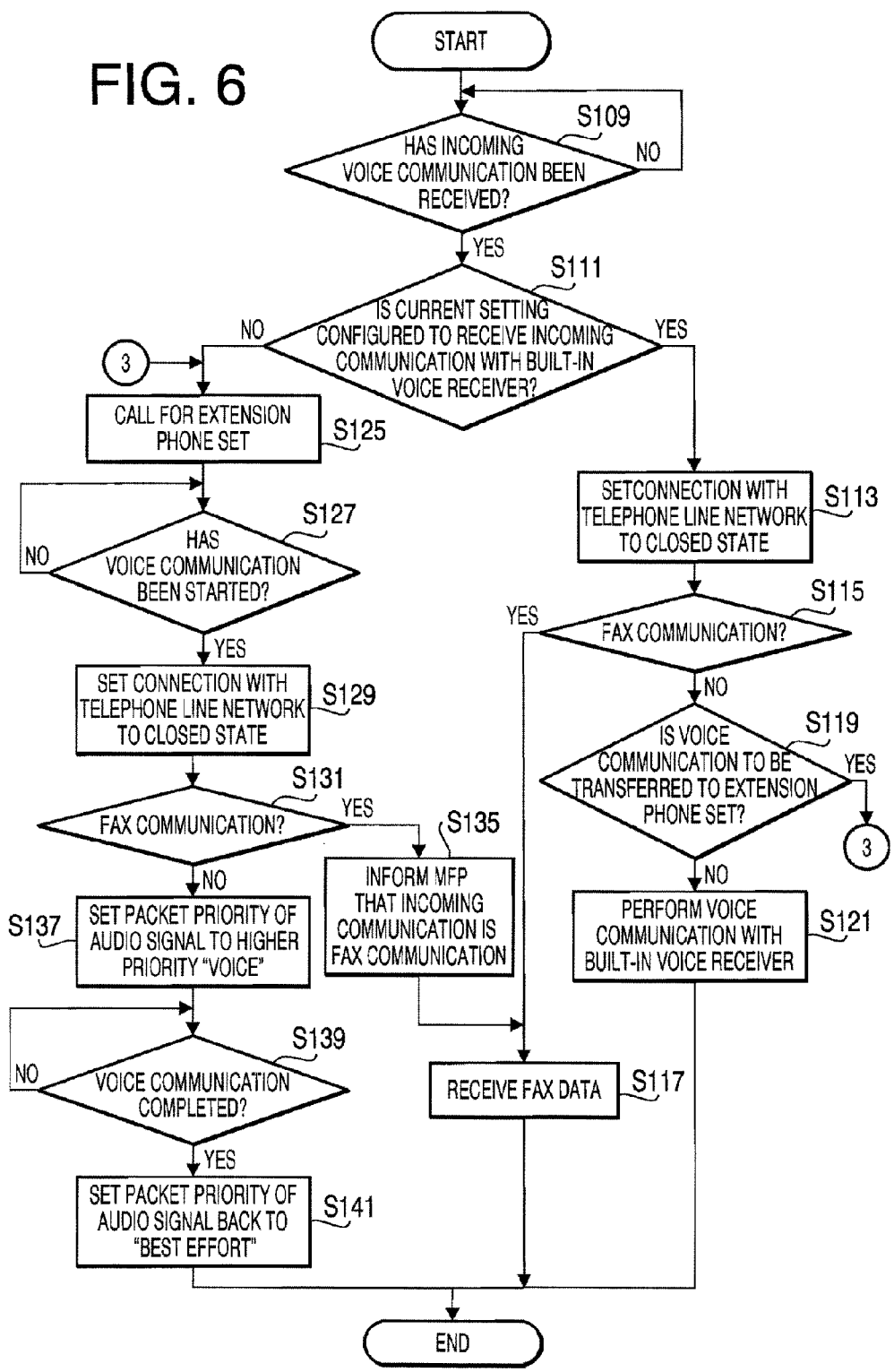

FIG. 6 is a flowchart showing a procedure of a process to be executed in a third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
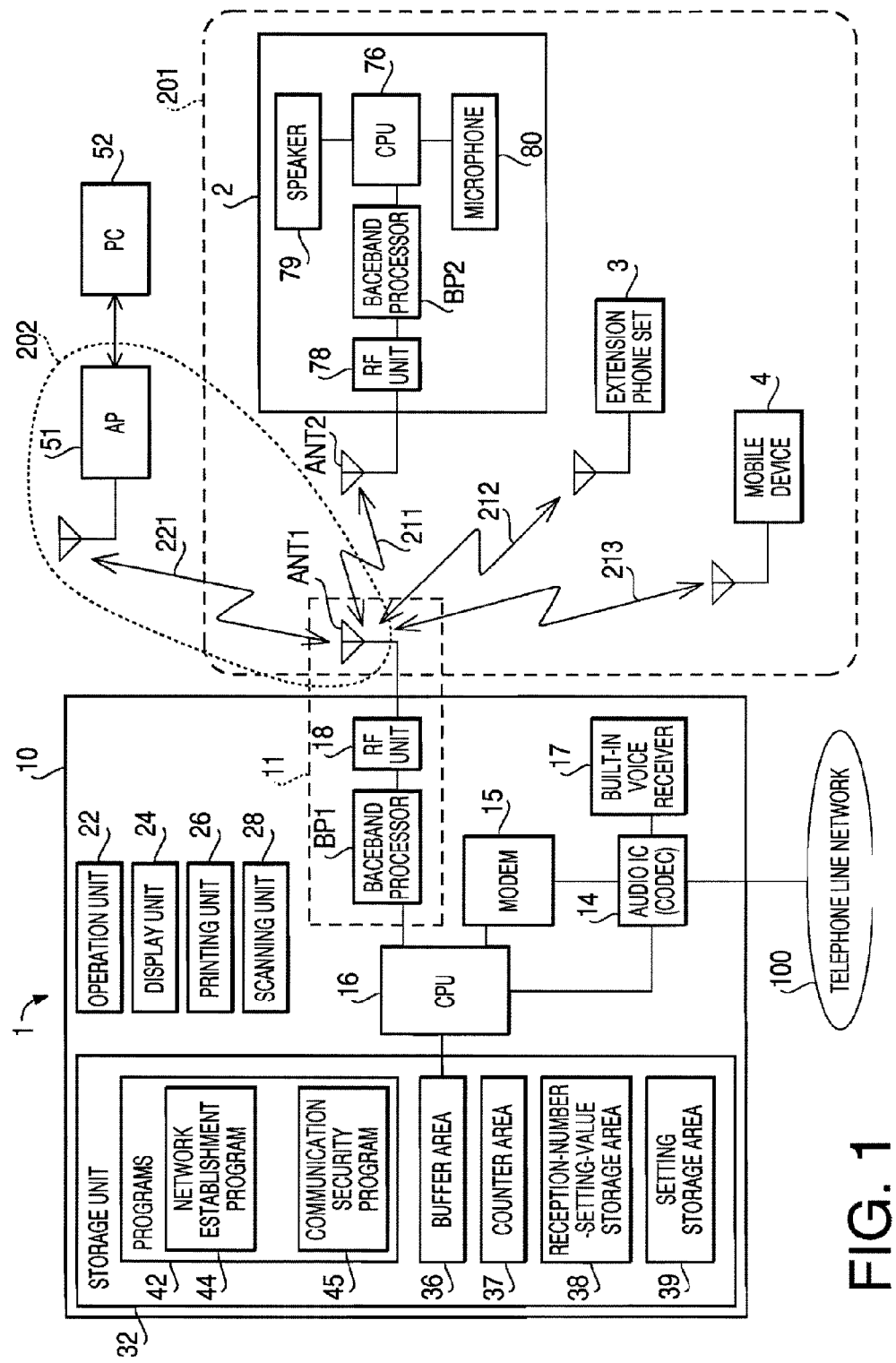

As shown in FIG. 1, a communication system 1 of a first embodiment according to aspects of the present invention includes a multi-function peripheral (MFP) 10, an access point (AP) 51, a PC 52, extension phone sets 2 and 3, and a mobile device 4. A wireless personal area network (WPAN) 201 and a wireless local area network (WLAN) 202 are formed to be connected with the MFP 10. It is noted that each of the WPAN 201 and the WLAN 202 may be established, e.g., based on a communication method complying with one of the standards IEEE 802.11a/b/g.

The AP 51 is a known relay device configured to perform data communication of a data signal via the WLAN 202. The data signal is re-transmitted in the case of a communication error. For instance, print data, based on which the MFP 10 perform printing, is cited as an example of the data signal. Further, the AP 51 is configured to transmit the data signal to the PC 52 or receive the data signal from the PC 52. In other words, data communication of the data signal is performed between the MFP 10 and the PC 52 via the AP 51.

The extension phone set 2 is configured to perform wireless communication 211 of an audio signal via the WPAN 201. Further, the extension phone set 3 is also configured to perform wireless communication 212 of an audio signal via the WPAN 201. The audio signal is a signal for performing voice communication. The audio signal is not re-transmitted in the case of a communication error, and is required to be transmitted on a real-time basis. The mobile device 4 is a known device configured to perform wireless communication 213 of the data signal via the WPAN 201.

The MFP 10 includes a CPU 16, a storage unit 32, a wireless communication control circuit 11, an audio IC 14 (CODEC), a modem 15, a built-in voice receiver 17, an operation unit 22, a display unit 24, a printing unit 26, and a scanning unit 28. The above elements included in the MFP 10 are communicably connected with each other.

The CPU 16 performs various processes in accordance with programs 42 stored on the storage unit 32. Further, the CPU 16 takes various controls for the storage unit 32, the wireless communication control circuit 11, and the audio IC 14.

The storage unit 32 stores the programs 42, which include basic programs (not shown), a network establishment program 44, and a voice communication security program 45. The basic programs include a program for making the printing unit 26 perform a printing operation, and a program for making the scanning unit 28 perform a scanning operation. The network establishment program 44 is a program for making the wireless communication control circuit 11 serve as a circuit to establish the WPAN 201 and the WLAN 202. In addition, the voice communication security program 45 is a program for preventing sound data transmitted between the extension phone set 2 and the MFP 10 from being stolen. The security level for voice communication may be set by a user.

The storage unit 32 includes a buffer area 36, a counter area 37, a reception-number-setting-value storage area 38, and a setting storage area 39. The buffer area 36 is an area to temporarily store a data signal received from an external device (e.g., the PC 52). The counter area 37 is an area to store the number N of receptions. The reception-number-setting-value storage area 38 is an area to store a reception number setting value X. The setting storage area 39 is an area to store an upper limit threshold UT, a lower limit threshold LT, and various settings for the MFP 10. It is noted that the storage unit 32 may be configured with a combination of at least two of a RAM, a ROM, a flash memory, and a hard disk drive (HDD).

The wireless communication control circuit 11 includes a baseband processor BP1, an RF unit 18, and an antenna ANT1. The baseband processor BP1 is a circuit configured to control the wireless communication control circuit 11 as a whole. The RF unit 18 is a circuit configured to perform signal communication with the antenna ANT 1.

The audio IC 14 (CODEC) is configured to perform data encoding and data decoding. Further, the audio IC 14 selects one of the modem 15 and the built-in voice receiver 17 that is to be connected with a telephone line network 100. The modem 15 is configured to control communication of an audio signal with the telephone line network 100. The operation unit 22 includes a plurality of buttons for accepting an input from the user. The display unit 24 is configured to display various kinds of information. The scanning unit 28 is configured to read a document and create scanned data based on the read document. The printing unit 26 is configured to print, on a sheet, print data received from an external device (e.g., the PC 52) and the scanned data created by the scanning unit 28.

The extension phone set 2 includes a CPU 76, a baseband processor BP2, an RF unit 78, a speaker 79, a microphone 80, and an antenna ANT2. The speaker 79 is configured to output sound data received from the wireless communication control circuit 11. The microphone 80 is configured to acquire sound data. Since the other elements included in the extension phone set 2 are substantially the same as elements of the MFP 10, detailed explanation about them will be omitted.

Subsequently, the WPAN 201 and WLAN 202 will be described. When the CPU 16 executes the network establishment program 44, the WPAN 201 and the WLAN 202 are established by the wireless communication control circuit 11.

The WPAN 201 and the WLAN 202 are concurrently available. For instance, the WPAN 201 and the WLAN 202 are concurrently available using a time division multiple access (TDMA) method. In the TDMA, a carrier frequency used for transmission is divided into units which are referred to as time slots, such that a plurality of users can share the same frequency channel to perform their respective communications. In the first embodiment, time slots are assigned to the WPAN 201 and WLAN 202, so as to establish multiple wireless connections. It is noted that the expression "the WPAN 201 and the WLAN 202 are concurrently available" in this case provides a meaning that communication using the WPAN 201 and communication using the WLAN 202 are executable in parallel during the same time period. However, the expression is not limited to a meaning that a packet transmitted from the WPAN 201 and a packet transmitted from the WLAN 202 can be received at the same moment.

It is noted that the method for using the WPAN 201 and the WLAN 202 together is not limited to the TDMA. The method may be a frequency division multiple access (FDMA) method or a code division multiple access (CDMA) method. Alternatively, the method may be adapted with a combination of at least two of the TDMA, the FDMA, and the CDMA.

To make the wireless communication control circuit 11 serve as a circuit to establish the WPAN 201, for instance, a method using a function of Wi-Fi Direct, which is proposed by the Wi-Fi Alliance, may be applied. Thereby, the wireless communication control circuit 11 is made function as a server for Wi-Fi Direct. Alternatively, a method using a function of My WiFi Technology, which is proposed by Intel (trademark registered), may be applied to make the wireless communication control circuit 11 serve as a circuit to establish the WPAN 201.

The WPAN 201 is linked with a plurality of communication terminals (e.g., the extension phone set 2, the extension phone set 3, and the mobile device 4). Through the WPAN 201, the wireless communication 211 of the audio signal is performed between the wireless communication control circuit 11 and the extension phone set 2. Further, through the WPAN 201, the wireless communication 212 of the audio signal is performed between the wireless communication control circuit 11 and the extension phone set 3. Furthermore, through the WPAN 201, the wireless communication 213 of the data signal is performed between the wireless communication control circuit 11 and the mobile device 4. The wireless communications 211 to 213 can be performed in concurrently.

Further, in the WPAN 201, it is monitored whether there is a wireless communication device connectable to the WPAN 201 in a communication area where communication using the WPAN 201 is available. When a connectable communication device is newly detected, the newly-detected communication device is connected to the WPAN 201 via wireless communication so as to dynamically establish a network in the WPAN 201. It is noted that the extension phone sets 2 and 3 may always be connected with the WPAN 201. Thereby, the user can use the extension phone sets 2 and 3 as if the extension phone sets 2 and 3 were normal cordless phones, without having to care about the presence of a dynamically-established network.

The WLAN 202 is connected with the AP 51. Through the WLAN 202, the wireless communication 221 of the data signal is performed between the wireless communication control circuit 11 and the AP 51.

An explanation will be provided about an example of a user interface for establishing a network (as an extension) of the WPAN 201. For instance, it is assumed that the extension phone set 2 is made connected to the WPAN 201. When the user operates the operation unit 22, a setting menu is displayed on the display unit 24. On the setting menu, a setting regarding the WPAN 201 and a setting regarding the extension phone set 2 are separately displayed.

Settings regarding the WPAN 201 may include, for example, settings regarding TCP/IP, a wireless connection wizard, WPS (Wi-Fi Protected Setup), and AOSS (AirStation One-Touch Secure System). Further, settings regarding the extension phone set 2 may include a communication preference setting, settings regarding establishment of a new wireless PAN network, and registration of a new extension phone set.

In the first embodiment, the following explanation will be provide under an assumption that the communication preference setting has three options (setting levels) "extension phone set higher prioritized," "extension phone set and print equally prioritized," and "print higher prioritized." The communication preference setting is a setting for determining a below-mentioned reception number setting value X. When the communication preference setting is set to "extension phone set higher prioritized," the reception number setting value X is set larger, and communication of the audio signal via the WPAN 201 is higher prioritized. Meanwhile, when the communication preference setting is set to "print higher prioritized," the reception number setting value X is set smaller, and communication of the data signal via the WLAN 202 is higher prioritized. When the communication preference setting is set by the user, the reception number setting value X is determined. The determined reception number setting value X is stored in the reception-number-setting-value storage area 38. It is noted that the options for the communication preference setting are not limited to three setting levels, but the communication preference setting may have more options (setting levels). When the communication preference setting has more setting levels, it is possible to control the communication preference setting in a finer manner.

Settings for connection of the extension phone set 3 with the WPAN 201 may be configured before factory shipment. Thereby, the user is not required to configure the settings for connection of the extension phone set 3 with the WPAN 201. Hence, the user can use the extension phone set 3 without caring via which network the communication with the MFP 10 is performed.

Figure 2:
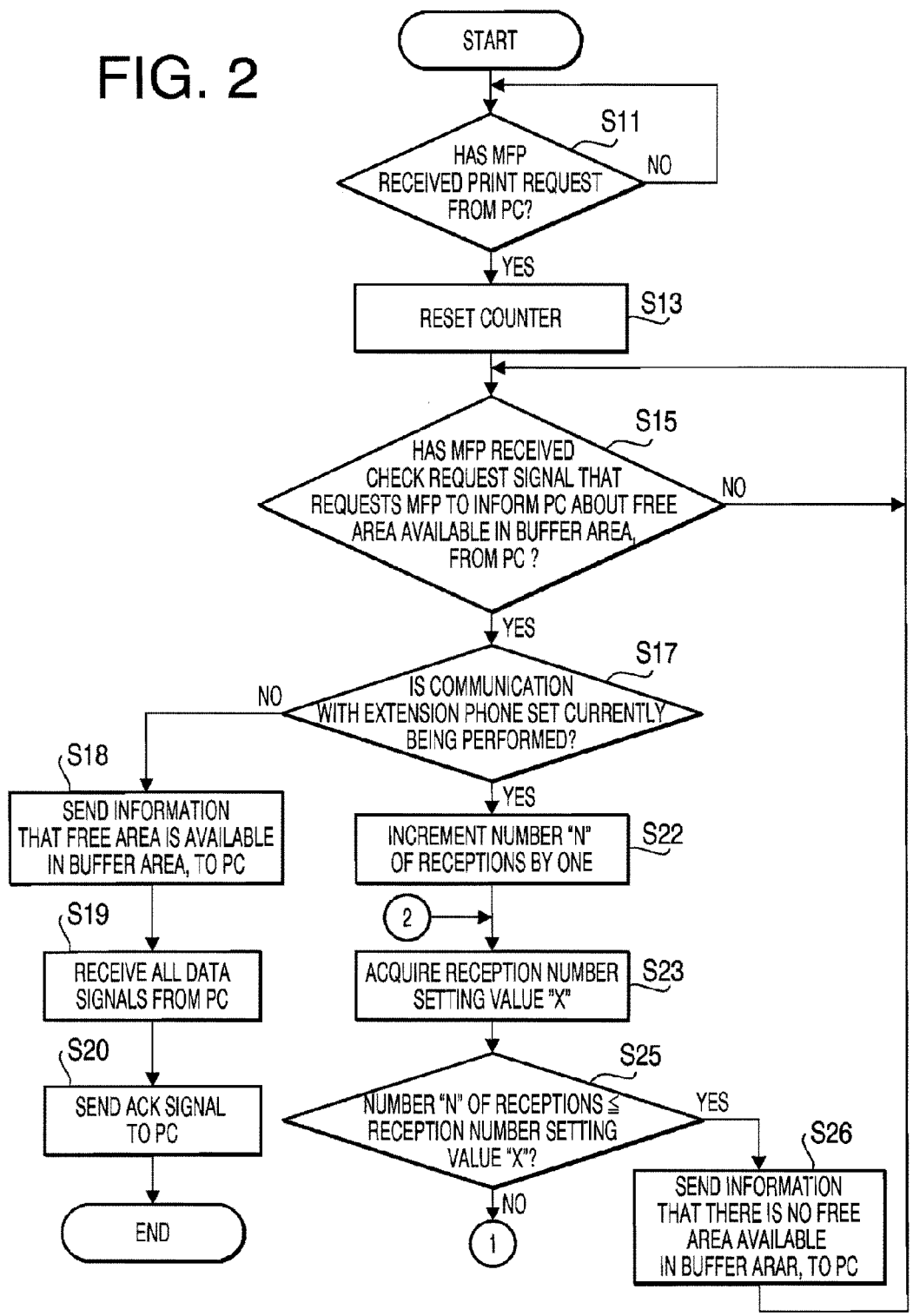
FIGS. 2 and 3 are flowcharts showing a procedure of a process to be executed in the first embodiment according to one or more aspects of the present invention.

Operations of the communication system 1 will be described under an assumption that the MFP 10 receives the data signal from the PC 52 and the audio signal from the extension phone set 2. In FIG. 2, the CPU 16 of the MFP 10 initially determines whether the MFP 10 has received a print request, which requests the MFP 10 perform a printing operation, from the PC 52 via the WLAN 202 (S11). When determining that the MFP 10 has not received a print request from the PC 52 via the WLAN 202 (S11: No), the CPU 16 goes back to S11. Meanwhile, when determining that the MFP 10 has received a print request from the PC 52 via the WLAN 202 (S11: Yes), the CPU 16 goes to S13, in which the CPU 16 assigns "0" to the number N of receptions that is stored in the counter area 37 to reset a counter (S13).

In S15, the CPU 16 determines whether the MFP 10 has received, from the PC 52, a check request signal that requests the MFP 10 to inform the PC 52 about a free area available in the buffer area 36 (S15). When determining that the MFP 10 has not received a check request signal from the PC 52 (S15: No), the CPU 16 goes back to S15, in which the CPU 16 waits for the MFP 10 to receive a check request signal. Meanwhile, when determining that the MFP 10 has received a check request signal from the PC 52 (S15: Yes), the CPU 16 goes to S17.

In S17, the CPU 16 determines whether the user is currently performing voice communication with the extension phone set 2 (S17). When determining that the user is not performing voice communication with the extension phone set 2 (S17: No), the CPU 16 goes to S18. In S18, the CPU 16 sends information that a free area is available in the buffer area 36, to the PC 52 via the WLAN 202 (S18). Thereby, the PC 52 is informed that the MFP 10 is permitted to receive the data signal from the PC 52. In response to receipt of the information that a free area is available in the buffer area 36, the PC 52 starts sending the data signal using the WLAN 202. In S19, the CPU 16 receives all data signals from the PC 52 via the WLAN 202 (S19). In S20, the CPU 16 sends an ACK signal to the PC 52. Thereby, the PC 52 is informed that all the data signals have been received. In response to receipt of the ACK signal, the PC 52 terminates transmission of the data signals. Then, the CPU 16 terminates the process shown in FIGS. 2 and 3.

Meanwhile, when determining that the user is performing voice communication with the extension phone set 2 (S17: Yes), the CPU 16 goes to S22, in which the CPU 16 increments the number N of receptions stored in the counter area 37 by one (S22). Thereby, in the counter area 37, the number of receptions of a transmission request signal from the PC 52 via the WLAN 202 is counted. It is noted that the transmission request signal requests the MFP 10 to receive a data signal transmitted by the PC 52. In S23, the CPU 16 acquires the current reception number setting value X from the reception-number-setting-value storage area 38 (S23).

In S25, the CPU 16 determines whether the number N of receptions is equal to or less than the reception number setting value X (S25). When determining that the number N of receptions is equal to or less than the reception number setting value X (S25: Yes), the CPU 16 goes to S26. In S26, the CPU 16 sends information that there is no free area available in the buffer area 36, to the PC 52 via the WLAN 202 (S26). In S26, even when there is actually a free area in the buffer area 36, the CPU 16 sends the information that there is no free area in the buffer area 36 to the PC 52. Thereby, the PC 52 is informed that the MFP 10 is not permitted to receive the data signal from the PC 52. Then, the CPU 16 goes back to S15.

In response to receipt of the information that there is no free area in the buffer area 36, the PC 52 waits in a standby state without sending the data signal. Thereby, it is possible to make the PC 52 wait in the standby state without sending the data signal during a predetermined time period.

Meanwhile, when determining that the number N of receptions is more than the reception number setting value X (S25: No), the CPU 16 goes to S27 (see FIG. 3), in which the CPU 16 sends information that there is a free area available in the buffer area 36, to the PC 52 via the WLAN 202. Thereby, the PC 52 is informed that the MFP 10 is permitted to receive the data signal. When receiving the information that there is a free area in the buffer area 36, the PC 52 starts sending a packet of data signals via the WLAN 202. In S29, the CPU 16 receives a part of the packets of data signals transmitted by the PC 52 (S29). Specifically, in S29, the CPU 16 receives a predetermined number of packets of the packets of data signals transmitted by the PC 52. The predetermined number may previously be determined by the user and stored in the setting storage area 39. Then, the predetermined number may be read out from the setting storage area 39 before the CPU 16 receives the predetermined number of packets.

In S30, the CPU 16 resets the number N of receptions to "0" (S30). In S31, the CPU 16 sends an ACK signal to the PC 52. Thereby, the PC 52 is informed that a part of the packets of data signals has been received by the MFP 10.

In S33, the CPU 16 determines whether the user is currently performing voice communication with the extension phone set 2 (S33). When determining that the user is currently performing voice communication with the extension phone set 2 (S33: Yes), the CPU 16 goes back to S23. Thus, repeatedly performed is the operation that when the number N of receptions exceeds the reception number setting value X, the CPU 16 prompts the PC 52 to send packets of data signals via the WLAN 202, and receives a part of the packets. Meanwhile, when determining that the user is not currently performing voice communication with the extension phone set 2 (S33: No), the CPU 16 goes to S35 based on determination that the voice communication using the extension phone set 2 has been completed. In S35, the CPU 16 sends to the PC 52 an instruction to transmit all of the remaining data signals (S35). Then, the CPU 16 receives all of the remaining data signals from the PC 52 via the WLAN 202. In S37, the CPU 16 sends an ACK signal to the PC 52. In response to receipt of the ACK signal, the PC 52 terminates the process of transmitting the data signals, and the CPU 16 terminates the process shown in FIGS. 2 and 3.

Further, in response to receipt of the information that the MFP 10 is not permitted to receive the data signal from the PC 52, the PC 52 retransmits the transmission request signal to the MFP 10 after waiting during the predetermined time period. When the MFP 10 does not accept any of a predetermined number of retransmissions of the transmission request signal, the PC 52 is put into a state "time-out error." In order to avoid the time-out error, preferably, the reception number setting value X may be set to a value smaller than the predetermined number of retransmissions by the PC 52. It is noted that the predetermined number of retransmissions by the PC 52 may be determined in various ways. For instance, he predetermined number of retransmissions by the PC 52 may previously be determined by the user.

As described above, the MFP 10 of the first embodiment provides the following effects. According to the MFP 10 of the first embodiment, it is possible to concurrently perform two kinds of communications, i.e., the communication of the sound data via the WPAN 201 and the communication of the data signal via the WLAN 202. In other words, it is possible to have both voice communication using the extension phone set 2 and a process for the PC 52 to make the MFP 10 perform printing implemented in parallel. Therefore, the MFP 10 needs not have a communication circuit adapted to be used exclusively for communication of the audio signal, and thus it is possible to reduce the cost for manufacturing the MFP 10.

Further, the MFP 10 of the first embodiment can make the PC 52 wait in a standby state without sending the data signal via the WLAN 202 until the number N of receptions of the repeatedly-transmitted check request signal reaches the reception number setting value X. Thus, it is possible to place a higher value on the communication via the WPAN 201 than on the communication via the WLAN 202. Thereby, it is possible to prevent an error caused in the voice communication via the WPAN 201 (e.g., an error that the voice communication breaks up due to delayed transfer of the sound data exchanged between the WPAN 201 and the extension phone set 2. Thus, it is possible to enhance quality of the voice communication.

Further, in the configuration adapted to perform voice communication between the extension phone set 2 and the MFP 10 using the WLAN 202 via the AP 51, the security level for the voice communication is determined by a security setting for the AP 51. Additionally, information contained in the voice communication might be stolen as being transmitted via the AP 51 used in common. However, the MFP 10 of the first embodiment can perform voice communication between the wireless communication control circuit 11 and the extension phone set 2 via the WPAN 201 without involving the AP 51. Therefore, the security level of the communication via the WPAN 201 can be set independently without relation to the security setting for the AP 51. Thereby, it is possible to ensure a high-level security of communication.

A second embodiment according to aspects of the present invention will be described with reference to FIGS. 4 and 5. The second embodiment is adapted to automatically set the reception number setting value X. A process shown in FIG. 4 is performed in parallel with the process shown in FIGS. 2 and 3 in the first embodiment. Detailed explanation will be omitted about other configurations of the second embodiment that are the same as those of the first embodiment.

In S49, the CPU 16 determines whether the user is currently performing voice communication with the extension phone set 2 (S49). When determining that the user is not currently performing voice communication with the extension phone set 2 (S49: No), the CPU 16 goes back to S49 to wait in a standby state. Meanwhile, when determining that the user is currently performing voice communication with the extension phone set 2 (S49: Yes), the CPU 16 goes to S51.

In S51, the CPU 16 acquires a user setting value that is set by the user through the operation unit 22 as the reception number setting value X, from the reception-number-setting-value storage area 38 (S51).

In S53, the CPU 16 acquires a current packet error rate (PER) of the WPAN 201 (S53). The PER is an error rate of packet transfer communication via the WPAN 201. The worse a condition of the packet transfer communication is the higher the PER is. The better the condition of the packet transfer communication is the lower the PER is. Thereby, it is possible to monitor the condition of the packet transfer communication.

An explanation will be provided about time fluctuation of the PER with reference to FIG. 5. The PER varies depending on several factors such as a distance between the extension phone set 2 and the MFP 10.

An upper limit threshold UT is an upper limit value of the PER for maintaining a high quality of communication. During a time period T1 in which the PER is equal to or more than the upper limit threshold UT, a problem such as breaking up of voice communication is likely to be caused. Further, a lower limit threshold LT is a lower limit value of the PER for maintaining a high level of radio wave efficiency. During a time period T2 in which the PER is equal to or lower than the lower limit threshold LT, although the WPAN 201 is in an excessively favorable communication condition, a higher value is placed on the communication via the WPAN 201 than on the communication via the WLAN 202. Therefore, during the time period T2, the radio wave efficiency is not so high due to a low communication speed for transmission of the data signal via the WLAN 202.

In S55, the CPU 16 determines whether the PER is equal to or more than the upper limit threshold UT (S55). When determining that the PER is equal to or more than the upper limit threshold UT (S55: Yes), the CPU 16 determines that the WPAN 201 is in an unfavorable communication condition, and goes to S57. In S57, the CPU 16 increments the reception number setting value X by one so as to place a one-step higher value on the communication via the WPAN 201 than the communication via the WLAN 202 (S57). Then, the CPU 16 goes to S63. Meanwhile, when determining that the PER is less than the upper limit threshold UT (S55: No), the CPU 16 determines that the WPAN 201 is in a favorable communication condition, and goes to S59.

In S59, the CPU 16 determines whether the PER is equal to or less than the lower limit threshold LT (S59). When determining that the PER is equal to or less than the lower limit threshold LT (S59: Yes), the CPU 16 determines that the WPAN 201 has an unfavorable radio wave efficiency, and goes to S61. In S61, the CPU 16 decrements the reception number setting value X by one so as to place a one-step lower value on the communication via the WPAN 201 than the communication via the WLAN 202 (S61). Then, the CPU 16 goes to S63. Meanwhile, when determining that the PER is more than the lower limit threshold LT (S59: No), the CPU 16 determines that the WPAN 201 has a favorable radio wave efficiency, and goes to S63.

In S63, the CPU 16 stores the adjusted reception number setting value X in the reception-number-setting-value storage area 38 (S63). In S65, the CPU 16 determines whether the user is still performing voice communication with the extension phone set 2 (S65). When determining that the user is still performing voice communication with the extension phone set 2 (S65: Yes), the CPU 16 goes to S67. In S67, the CPU 16 waits for a minute, and thereafter goes back to S53. Meanwhile, when determining that the user is not performing voice communication with the extension phone set 2 (S65: No), the CPU 16 terminates the process shown in FIG. 4.

The MFP 10 of the second embodiment provides the following effects. When the communication condition of the WPAN 201 becomes worse, the MFP 10 of the second embodiment places a higher value on the communication via the WPAN 201 by increasing the reception number setting value X. Therefore, it is possible to prevent a problem such as breaking up of voice communication. Further, when the communication condition of the WPAN 201 becomes better, the MFP 10 of the second embodiment places a higher value on the communication via the WLAN 202 by decreasing the reception number setting value X. Thereby, it is possible to enhance the communication speed for transmission of the data signal via the WLAN 202. Thus, it is possible to enhance the radio wave efficiency while maintaining a high quality of voice communication using the extension phone set 2.

Subsequently, a third embodiment according to aspects of the present invention will be described with reference to FIG. 6. The third embodiment is adapted with a higher priority placed on a packet of audio signals than on a packet of data signals, using a WMM (Wi-Fi Multimedia) technology. The WMM is a standard determined by the Wi-Fi Alliance to realize QoS (Quality of Service) control in a wireless LAN and efficient transmission of streaming data such as video data and sound data. In the WMM, specific kinds of communications in the wireless LAN are prioritized to secure respective wavelength bands so as to prevent the streaming data such as video data and sound data from breaking up. Specifically, in the WMM, four categories "voice," "video," "best effort," and "background" are defined in descending order of the packet priority. Thus, a packet of a higher packet priority is preferentially transmitted.

In the third embodiment, an explanation will be provided about a case where an initial value for the packet priority of the audio signal to be transmitted via the WPAN 201 is set to "best effort." Further, an explanation will be provided about a case where the packet priority of the data signal to be transmitted via the WLAN 202 is fixedly set to "best effort."

In S109, the CPU 16 determines whether there is an incoming call for voice communication received from the extension phone set 2 via the WPAN 201 (S109). When determining that there is not an incoming call for voice communication received from the extension phone set 2 via the WPAN 201 (S109: No), the CPU 16 goes back to S109, and waits in a standby state. Meanwhile, when determining that there is an incoming call for voice communication received from the extension phone set 2 via the WPAN 201 (S109: Yes), the CPU 16 goes to S111.

In S111, the CPU 16 determines whether a current setting is configured to receive an incoming communication with the built-in voice receiver 17 of the MFP 10 (S111). The determination may be made with reference to a previously-stored setting read out from the setting storage area 39 or a user-selected setting. When determining that the current setting is not configured to receive an incoming call with the built-in voice receiver 17 of the MFP 10 (S111: No), the CPU 16 goes to S125. Meanwhile, when determining that the current setting is configured to receive an incoming call with the built-in voice receiver 17 of the MFP 10 (S111: Yes), the CPU 16 goes to S113, in which the CPU 16 sets the connection with the telephone line network 100 to a closed state (i.e., an effective state).

In S115, the CPU 16 determines whether the incoming communication is facsimile communication (S115). When determining that the incoming communication is facsimile communication (S115: Yes), the CPU 16 goes to S117 to receive facsimile data, and then terminates the process shown in FIG. 6. Meanwhile, when determining that the incoming communication is not facsimile communication (S115: No), the CPU 16 determines that the incoming communication is voice communication. Hence, the CPU 16 goes to S119, in which the CPU 16 determines whether to transfer the voice communication to the extension phone set 2 (S119). The determination may be made based on a previously-stored setting read out from the setting storage area 39 or a user-selected setting. When determining not to transfer the voice communication to the extension phone set 2 (S119: No), the CPU 16 goes to S121, in which the CPU 16 performs the voice communication with the built-in voice receiver 17 (S121). Meanwhile, when determining to transfer the voice communication to the extension phone set 2 (S119: Yes), the CPU 16 goes to S125.

In S125, the CPU 16 calls for the extension phone set 2 (S125). In S127, the CPU 16 determines whether the user has started voice communication using the extension phone set 2 (S127). When determining that the user has not started voice communication using the extension phone set 2 (S127: No), the CPU 16 goes back to S127, in which the CPU 16 waits in a standby state. When determining that the user has started voice communication using the extension phone set 2 (S127: Yes), the CPU 16 goes to S129, in which the CPU 16 sets the connection with the telephone line network 100 to the closed state.

In S131, the CPU 76 of the extension phone set 2 determines whether the incoming communication is facsimile communication (S131). When determining that the incoming communication is facsimile communication (S131: Yes), the CPU 76 goes to S135, in which the CPU 76 informs the MFP 10 that the incoming communication is facsimile communication (S135). Then, in S117, the MFP 10 receives facsimile data, and the process shown in FIG. 6 is terminated. Meanwhile, when determining that the incoming communication is not facsimile communication (S131: No), the process proceeds to S137.

In S137, the CPU 16 sets the packet priority of the audio signal to a higher priority "voice" (S137). Thereby, the packet priority of the audio signal transmitted via the WLAN 201 is set higher than the packet priority of the data signal transmitted via the WLAN 202. Thus, the wireless communication control circuit 11 transmits a packet of audio signals in preference to a packet of data signals. Therefore, it is possible to place a higher priority on the communication using the WPAN 201 than on the communication using the WLAN 202.

In S139, the CPU 16 determines whether the voice communication using the extension phone set 2 has been completed (S139). When determining that the communication using the extension phone set 2 has not been completed (S139: No), the CPU 16 goes back to S139, and continues the communication using the extension phone set 2. When determining that the communication using the extension phone set 2 has been completed (S139: Yes), the CPU 16 goes to S141.

In S141, the CPU 16 sets the packet priority of the audio signal back to "best effort" from "voice" (S141). Thereby, the communication using the WPAN 201 and the communication using the WLAN 202 are equally prioritized. Thereafter, the process shown in FIG. 6 is terminated.

As described above, in the MFP 10 of the third embodiment, during a time period in which the WPAN 201 is not used, the packet priority of the audio signal transmitted via the WPAN 201 is equal to the packet priority of the data signal transmitted via the WLAN 202. Further, during a time period in which the WPAN 201 is used, the packet priority of the audio signal transmitted via the WPAN 201 is set to a higher priority. Therefore, it is possible to place a higher priority on the communication via the WPAN 201 than on the communication via the WLAN 202, and thus enhance quality of the voice communication.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The method for making the PC 52 wait in a standby state without sending a data signal during a predetermined time period is not limited to the method described in the aforementioned first embodiment. For instance, the PC 52 may be made wait in a standby state without sending a data signal during a predetermined time period by using an RTS (Request to Send) signal and a CTS (Clear to Send) signal. The RTS signal is a request for transmission of the data signal from the PC 52 to the MFP 10. The CTS signal is a signal informing of permission for the MFP 10 to transmit data to the PC 52.

Figure 3:
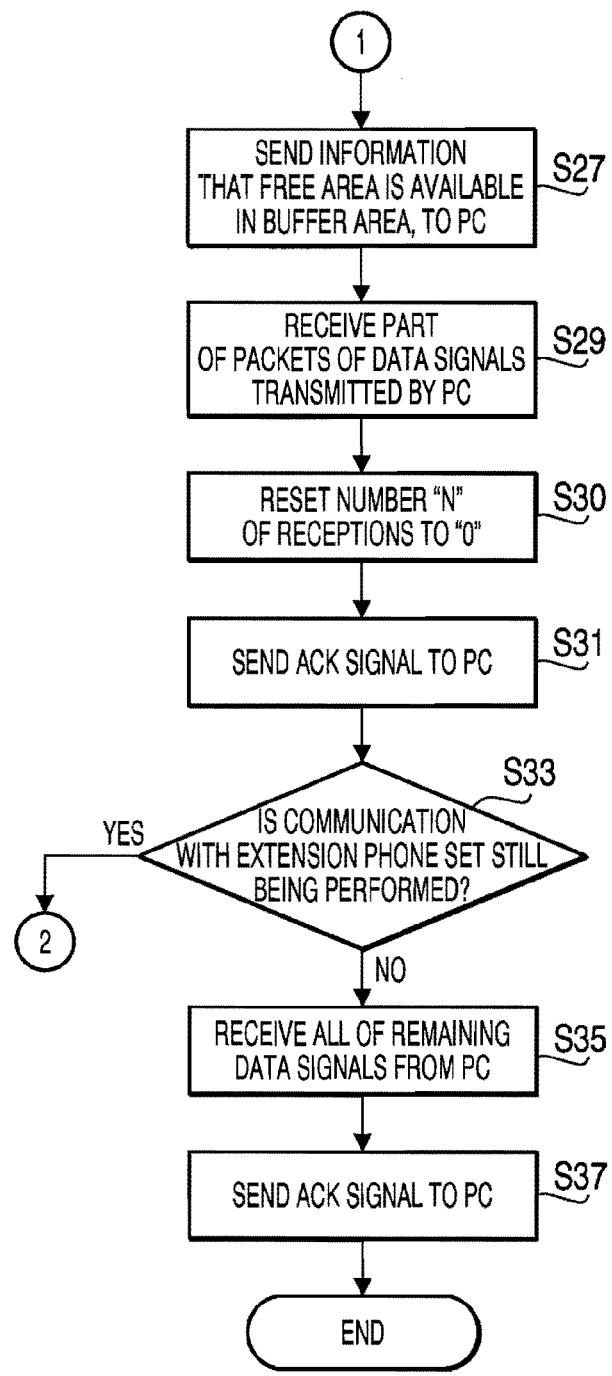
Figure 4:
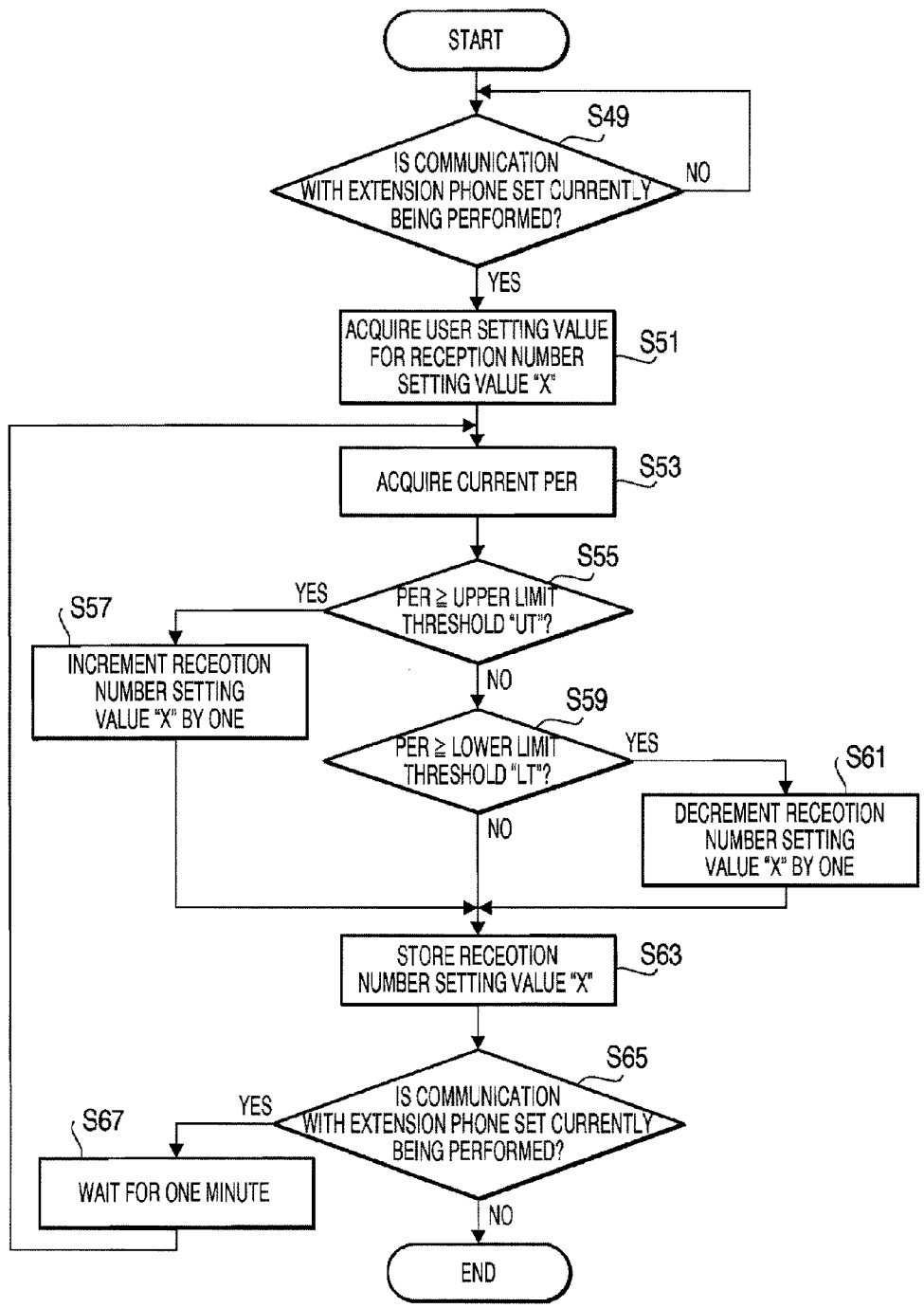
FIG. 4 is a flowchart showing a procedure of a process to be executed in a second embodiment according to one or more aspects of the present invention.

Explanation will be provided about changes in the flowcharts shown in FIGS. 2 and 3 that may be added when the RTS signal and the CTS signal are applied. The step S15 may be modified to determine whether the MFP 10 has received an RTS signal from the PC 52. Further, the steps S18 and S27 may be modified to transmit a CTS signal to the PC 52 via the WLAN 202. Further, the step S26 may be modified not to transmit a CTS signal to the PC 52. Moreover, the MFP 10 may be configured to, even when receiving an RTS signal (S15: Yes), continue the communication using the WPAN 201 (without stopping the communication using the WPAN 201).

Thereby, the PC 52 keeps waiting without transmitting a data signal, until receiving the CTS signal transmitted by the MFP 10. Thus, it is possible to make the PC 52 wait in a standby state without transmitting a data signal during a predetermined time period. Hence, it is possible to place a higher value on the communication via the WPAN 201 than on the communication via the WLAN 202.

Further, the MFP 10 may be configured with a communication unit and a multi-function unit that are physically separated from one another. The communication unit may include elements of the MFP 10 that are required to control communication using the telephone line network 100. The multi-function unit 10 may includes elements of the MFP 10 that are required to achieve multiple functions such as a scanning function and a printing function, other than the elements of the communication unit. In this case, the WPAN 201 and the WLAN 202 may be established by the communication unit. In addition, the communication unit and the multi-function unit may be configured to communicate with each other via the WLAN 202. Thereby, it is possible to form a dispersed multi-function peripheral with the communication unit and the multi-function unit. Thus, since a connector of the telephone line network 100 is not required to be connected directly with a large-volume MFP 10, it is possible to lay out the MFP 10 in a more appropriate manner and enhance user-friendliness.

What is claimed is:

1. A communication device comprising:
a wired communication unit configured to perform communication of a voice signal with a party device via a communication line;
a wireless communication unit configured to perform wireless communication of a data signal with an external device;
a controller configured to perform a first wireless communication and a second wireless communication in parallel, using the wireless communication unit,
a counter configured to count a number of receptions of a request signal, which requests the communication device to receive a data signal transmitted by the external device, from the external device via the second wireless communication;
a setting value storage unit configured to store a reception number setting value;
a first informing unit configured to, when the number of receptions of the request signal that is counted by the counter is equal to or less than the reception number setting value stored on the setting value storage unit, inform the external device that the data signal transmitted by the external device is not permitted to be received; and
a second informing unit configured to, when the number of receptions of the request signal that is counted by the counter is more than the reception number setting value stored on the setting value storage unit, inform the external device that the data signal transmitted by the external device is permitted to be received,
wherein the first wireless communication is adapted to enable wireless communication of the voice signal between a voice communication device and the wired communication unit via the wireless communication unit,
wherein the second wireless communication is adapted to enable wireless communication of the data signal between the external device and the wireless communication unit,
wherein the controller is configured to, during a time period, to perform the first wireless communication and the second wireless communication in parallel, place a higher priority on the first wireless communication than on the second wireless communication.

2. The communication device according to claim 1, further comprising a communication status monitor configured to monitor a status of the first communication,
wherein the setting value storage unit is configured to, when the communication status monitor detects a worsened state of the first communication, increment the reception number setting value, and
wherein the setting value storage unit is configured to, when the communication status monitor detects a bettered state of the first communication, decrement the reception number setting value.

3. The communication device according to claim 1, further comprising a buffer configured to store the data signal received from the external device,
wherein the first informing unit is configured to, when the number of receptions of the request signal that is counted by the counter is equal to or less than the reception number setting value stored on the setting value storage unit, inform the external device that there is no area available in the buffer.

4. The communication device according to claim 1,
wherein the first informing unit is configured to inform the external device that the data signal transmitted by the external device is not permitted to be received, by providing no response to the request signal transmitted by the external device, and
wherein the second informing unit configured to inform the external device that the data signal transmitted by the external device is permitted to be received, by providing a response to the request signal transmitted by the external device.

5. The communication device according to claim 1, further comprising:
a detecting unit configured to detect whether the first wireless communication of the voice signal is continuously being performed using the wireless communication unit; and
a priority setting unit configured to, while the detecting unit detects that the first wireless communication of the voice signal is continuously being performed using the wireless communication unit, place a higher priority on the voice signal than on the data signal,
wherein controller is configured to preferentially transmit and receive one, of the voice signal and the data signal, on which a higher priority is placed.

6. The communication device according to claim 1,
wherein the controller is configured to detect a wireless communication device present within a communication area of the first wireless communication, and dynamically establish a connection and a network with the detected wireless communication device.

7. The communication device according to claim 1,
wherein the controller is configured to perform the first wireless communication and the second wireless communication in parallel, with the wireless communication unit, using at least one of a time division multiple access (TDMA) method, a frequency division multiple access (FDMA) method, and a code division multiple access (CDMA) method.

8. A non-transitory computer-readable storage device storing computer-readable instructions,
wherein when executed by a processor that comprises:
a wired communication unit configured to perform communication of a voice signal with a party device via a communication line;
a wireless communication unit configured to perform wireless communication of a data signal with an external device;
a counter configured to count a number of receptions of a request signal, which requests the communication device to receive a data signal transmitted by the external device, from the external device via a second wireless communication; and
a setting value storage unit configured to store a reception number setting value, the instructions cause the processor to:
perform a first wireless communication and the second wireless communication in parallel, using the wireless communication unit,
when the number of receptions of the request signal that is counted by the counter is equal to or less than the reception number setting value stored on the setting value storage unit, inform the external device that the data signal transmitted by the external device is not permitted to be received; and when the number of receptions of the request signal that is counted by the counter is more than the reception number setting value stored on the setting value storage unit, inform the external device that the data signal transmitted by the external device is permitted to be received, wherein the first wireless communication is adapted to enable wireless communication of the voice signal between a voice communication device and the wired communication unit via the wireless communication unit, wherein the second wireless communication is adapted to enable wireless communication of the data signal between the external device and the wireless communication unit, wherein, while the processor is performing the first wireless communication and the second wireless communication in parallel, the instructions cause the processor to place a higher priority on the first wireless communication than on the second wireless communication.

9. The non-transitory computer-readable storage device according to claim 8, wherein the instructions cause the processor to:
monitor a status of the first communication;
when a worsened state of the first communication is detected, increment the reception number setting value stored on the setting value storage unit; and
when a bettered state of the first communication is detected, decrement the reception number setting value stored on the setting value storage unit.

10. The non-transitory computer-readable storage device according to claim 8, wherein the processor further comprises a buffer configured to store the data signal received from the external device, wherein the instructions cause the processor to, when the number of receptions of the request signal that is counted by the counter is equal to or less than the reception number setting value stored on the setting value storage unit, inform the external device that there is no area available in the buffer.

11. The non-transitory computer-readable storage device according to claim 8, wherein the instructions cause the processor to:
inform the external device that the data signal transmitted by the external device is not permitted to be received, by providing no response to the request signal transmitted by the external device; and
inform the external device that the data signal transmitted by the external device is permitted to be received, by providing a response to the request signal transmitted by the external device.

12. The non-transitory computer-readable storage device according to claim 8, wherein the instructions cause the processor to:
detect whether the first wireless communication of the voice signal is continuously being performed using the wireless communication unit;
while detecting that the first wireless communication of the voice signal is continuously being performed using the wireless communication unit, place a higher priority on the voice signal than on the data signal; and preferentially transmit and receive one, of the voice signal and the data signal, on which a higher priority is placed.

13. The non-transitory computer-readable storage device according to claim 7, wherein the instructions cause the processor to detect a wireless communication device that is present within a communication area of the first wireless communication, and dynamically establish a connection and a network with the detected wireless communication device.

14. The non-transitory computer-readable storage device according to claim 8, wherein the instructions cause the processor to perform the first wireless communication and the second wireless communication in parallel, with the wireless communication unit, using at least one of a time division multiple access (TDMA) method, a frequency division multiple access (FDMA) method, and a code division multiple access (CDMA) method.

15. A method adapted to be implemented on a processor that comprises:

a wired communication unit configured to perform communication of a voice signal with a party device via a communication line; and a wireless communication unit configured to perform wireless communication of a data signal with an external device;

a counter configured to count a number of receptions of a request signal, which requests the communication device to receive a data signal transmitted by the external device, from the external device via a second wireless communication; and the method comprising:
performing a first wireless communication and the second wireless communication in parallel, using the wireless communication unit;
when the number of receptions of the request signal that is counted by the counter is equal to or less than the reception number setting value stored on the setting value storage unit, informing the external device that the data signal transmitted by the external device is not permitted to be received; and
when the number of receptions of the request signal that is counted by the counter is more than the reception number setting value stored on the setting value storage unit, informing the external device that the data signal transmitted by the external device is permitted to be received, wherein the first wireless communication is adapted to enable wireless communication of the voice signal between a voice communication device and the wired communication unit via the wireless communication unit, wherein the second wireless communication is adapted to enable wireless communication of the data signal between the external device and the wireless communication unit, wherein, while the processor is performing the first wireless communication and the second wireless communication in parallel, the method further comprises placing a higher priority on the first wireless communication than on the second wireless communication.

* * * * *